United States Patent
Tseng (10) Patent No.: US 11,176,854 B2
(45) Date of Patent: Nov. 16, 2021

(54) ILLUMINATING DEVICE AND WEARABLE OBJECT WITH LIGHTING FUNCTION

(71) Applicant: Shen-Ko Tseng, Taipei (TW)

(72) Inventor: Shen-Ko Tseng, Taipei (TW)

( * ) Notice: Subject to any disclaimer, the term of this patent is extended or adjusted under 35 U.S.C. 154(b) by 0 days.

(21) Appl. No.: 16/273,811

(22) Filed: Feb. 12, 2019

(65) Prior Publication Data

US 2019/0246733 A1    Aug. 15, 2019

(30) Foreign Application Priority Data

Feb. 13, 2018   (CN) .......................... 201820255382.6

(51) Int. Cl.

| | | |
|---|---|---|
| *A43B 3/00* | (2006.01) | |
| *G09F 21/02* | (2006.01) | |
| *G09F 9/33* | (2006.01) | |
| *H05B 47/18* | (2020.01) | |
| *H05B 47/115* | (2020.01) | |
| *G09F 13/22* | (2006.01) | |

(52) U.S. Cl.
CPC .............. *G09F 21/02* (2013.01); *A43B 3/001* (2013.01); *A43B 3/0021* (2013.01); *G09F 9/33* (2013.01); *H05B 47/115* (2020.01); *H05B 47/18* (2020.01); *G09F 21/023* (2020.05); *G09F 2013/222* (2013.01)

(58) Field of Classification Search
None
See application file for complete search history.

(56) References Cited

U.S. PATENT DOCUMENTS

| | | | | |
|---|---|---|---|---|
| 4,709,307 | A * | 11/1987 | Branom ............... | A41D 27/085 362/103 |
| 5,128,843 | A * | 7/1992 | Guritz .................. | A41D 27/085 362/103 |
| 5,329,431 | A * | 7/1994 | Taylor ................ | G05B 19/0421 362/85 |
| 5,373,651 | A * | 12/1994 | Wood ....................... | A43B 3/00 36/1 |
| 5,720,200 | A * | 2/1998 | Anderson ............ | A61B 5/1036 73/172 |
| 9,389,057 | B2 * | 7/2016 | Meschter ............. | H04N 5/9205 |
| 10,269,272 | B1 * | 4/2019 | Wainwright ........... | G09F 9/305 |
| 10,629,103 | B2 * | 4/2020 | Forgey ..................... | G09G 3/16 |
| 2005/0134191 | A1 * | 6/2005 | Wong .................... | A43B 1/0036 315/200 A |
| 2007/0041193 | A1 * | 2/2007 | Wong .................... | A43B 3/0005 362/276 |
| 2008/0019119 | A1 * | 1/2008 | Marston ............... | A43B 1/0072 362/103 |

(Continued)

*Primary Examiner* — Elmito Breval (57) ABSTRACT

An illuminating device includes an illuminating component set, a controlling circuit coupled to the illuminating component set, and a communication circuit electrically coupled to the controlling circuit. The controlling circuit further includes a storage and a processor electrically connected to the storage. The communication circuit is configured for receiving a picture transmitted by an input device and storing the picture into the storage. The processor selectively drives the illuminating component set to emit light according to a controlling signal and the picture. The illuminating device can be configured on a wearable object, so that the wearable object can be controlled to emit light by the input device.

20 Claims, 7 Drawing Sheets

(56) References Cited

U.S. PATENT DOCUMENTS

| | | | |
|---|---|---|---|
| 2008/0066343 A1* | 3/2008 | Sanabria-Hernandez | ................... A43B 3/001 36/43 |
| 2008/0203144 A1* | 8/2008 | Kim | ...................... A61B 5/1118 235/105 |
| 2011/0087445 A1* | 4/2011 | Sobolewski | ............. A43B 5/00 702/44 |
| 2011/0309772 A1* | 12/2011 | Forgey | ................... G09F 13/22 315/308 |
| 2013/0039088 A1* | 2/2013 | Khan | ................... F21V 33/008 362/543 |
| 2014/0268839 A1* | 9/2014 | Timmerberg | .......... H05B 47/19 362/473 |
| 2015/0029005 A1* | 1/2015 | Kim | ...................... A43B 3/001 340/12.5 |
| 2017/0135178 A1* | 5/2017 | Sutton | ...................... A45C 3/06 |
| 2017/0262884 A1* | 9/2017 | Miller | .................... A45C 15/00 |
| 2018/0160975 A1* | 6/2018 | London | ................ A43B 3/0021 |
| 2018/0199657 A1* | 7/2018 | Kikukawa | ............ A43B 1/0027 |
| 2019/0179286 A1* | 6/2019 | Horseman | ................ A43B 3/02 |
| 2019/0328085 A1* | 10/2019 | Bock | ........................ A43B 5/00 |
| 2020/0001102 A1* | 1/2020 | Del Biondi | ............. A61N 2/02 |

* cited by examiner

ILLUMINATING DEVICE AND WEARABLE OBJECT WITH LIGHTING FUNCTION

CROSS-REFERENCE TO RELATED APPLICATIONS

This application claims the priority benefit of Chinese Application Serial No. 201820255382.6 filed Feb. 13, 2018 the disclosure of which is incorporated herein by reference.

BACKGROUND OF THE INVENTION

1. Field of the Invention

The present invention relates to an illuminating device and wearable object with lighting function, and more specifically, to an illuminating device and wearable object with lighting function selectively emitting light according to the input signal and timely generating different pictures and visual effects through the remote inputting and motion sensing.

2. Description of the Prior Art

Owing to the popularity of miniaturized light sources in recent years, illuminating components have been commonly installed on non-electronic products, such as shoes, clothes, hats, backpacks, or any object that can be carried or worn. For example, a Light Emitting Device (LED) can be the miniaturized light source installed on the products. The form of the miniaturized light source configured on a portable object has not only a safety warning function, but also a beautifying effect of the unique visual appearance. For example, if the shoes or clothes of the pedestrians or children can emit light or glare with different colors, it can remind the driver of the existence of the pedestrians or children at night or in the dark to avoid accidents. In addition, the wearable objects with an illuminating function also have a decorative effect.

At present, the way to use the miniaturized light sources or LEDs to decorate portable objects or wearable objects is to directly configure the illuminating devices including LEDs or similar miniaturized illuminating components on wearable objects and personal belongings. The controlling circuit of the illuminating device is partially hided inside the wearable object, and the illuminating components controlled by the controlling circuit can be directly configured on the surface of the wearable object, under the light transmissive surface of the wearable object, or inside the wearable object connected to the light-guiding component.

In the prior art, the motion conditions to drive the illumination, the illuminating effect, and the displayed pattern content of the illuminating device are preset inside the illuminating device before leaving the factory. However, it is difficult for the user to adjust the above conditions, special effects and contents except turning on or off the power. Therefore, it is necessary to develop an illuminating device and a wearable object allowing the wearer or user to remotely transmit and instantly change the message in convenient ways without directly giving commands to the controlling circuit and the storage in the device to solve the above problem.

SUMMARY OF THE INVENTION

The present invention is to provide an illuminating device which can instantly emit light according to the picture and the illuminating mode sent by the input device. In order to achieve the above purpose, the present invention discloses an illuminating device including an illuminating component set, a controlling circuit coupled to the illuminating component set, and a communication circuit electrically coupled to the controlling circuit. The illuminating component set includes a plurality of illuminating components. The controlling circuit includes a storage, a processor electrically connected to the storage, and a motion sensor coupled to the processor. The motion sensor generates a controlling signal while sensing an external force applied on the controlling circuit. The communication circuit is configured for receiving a picture transmitted by an input device outside of the illuminating device and storing the picture into the storage. The processor selectively drives the illuminating component to emit light according to the controlling signal and the picture.

In one embodiment, the communication circuit receives an illuminating mode transmitted by the input device and stores the illuminating mode into the storage, and the processor selectively drives the illuminating components to emit light according to the controlling signal, the picture and the illuminating mode.

In one embodiment, the storage stores an illuminating color, a display frequency, or a predetermined amount of pixels displayed in the picture.

In one embodiment, the storage stores a text, a string, a symbol group or a graph.

In one embodiment, the processor sequentially and selectively drives the illuminating component to display the complete picture.

In one embodiment, the plurality of illuminating components are arranged in a two-dimensional array. When the picture is a string, the processor drives the plurality of illuminating components according to the controlling signal to make the two-dimensional array to sequentially display each character in the string.

In one embodiment, the processor ignores the controlling signal transmitted by the motion sensor when the plurality of illuminating components have not sequentially displayed all characters in the string.

In one embodiment, the processor receives the controlling signal transmitted by the motion sensor and re-drives the plurality of illuminating components to make the two-dimensional array to sequentially display each character in the string when the plurality of illuminating components have not sequentially displayed all characters in the string.

In one embodiment, when the plurality of illuminating components have not sequentially displayed all characters in the string and the controlling signal is transmitted by the motion sensor to the processor, the processor re-drives the plurality of illuminating components to sequentially display each character in the string.

In one embodiment, the communication circuit receives another picture transmitted by the input device and does not store the picture into the storage when the plurality of illuminating components have not sequentially displayed all characters in the string.

In one embodiment, the communication circuit ignores another picture transmitted by the input device when the plurality of illuminating components have not sequentially displayed all characters in the string.

In one embodiment, the plurality of illuminating components are arranged in a two-dimensional array. When the storage stores the string and the string includes a first character to an Nth character, the processor sequentially selects an Xth character from the N characters according to the order of the received controlling signals and drives the plurality of illuminating components to display the Xth character, wherein X≤N.

In one embodiment, the plurality of illuminating components are arranged in a two-dimensional array and the storage stores the string and the string includes a first character to an Nth character, when the processor sequentially receives a plurality of controlling signals, the processor correspondingly and sequentially selects an Xth character from the N characters and drives the plurality of illuminating components to display the Xth character, wherein X≤N.

In one embodiment, the processor receives the controlling signal transmitted by the motion sensor to drive the plurality of illuminating components to display the first character after driving the plurality of illuminating components to display the Nth character.

In one embodiment, after displaying the Nth character, the processor then displaying the first character in the event the processor further receives a first controlling signal.

In one embodiment of, the communication circuit stores another string transmitted by the input device into the storage after the processor drives the plurality of illuminating components to display the Xth character.

In one embodiment, the processor receives the controlling signal transmitted by the motion sensor to drive the plurality of illuminating components to display an X+1th character of another string after the communication circuit stores another string into the storage.

In one embodiment, after the communication circuit stores another string into the storage, the processor then driving the plurality of illuminating components to display an X+1th character of another string in the event the processor receives a second controlling signal.

In one embodiment, the communication circuit matches an application program stored in the input device, and the communication circuit receives the picture and the illuminating mode transmitted by the application program through the input device.

In one embodiment, the illuminating device further includes a sound circuit coupled to the controlling circuit. The communication circuit receives a sound transmitted by the input device and stores the sound into the storage, and the processor drives the sound circuit to play the sound according to the controlling signal.

In one embodiment of the present invention, the illuminating components include a first light emitting diode and a second light emitting diode which can emit different colors.

Another scope of the present invention is to provide a wearable object with lighting function which includes a main body, an illuminating component set, a controlling circuit and a communication circuit. The illuminating component set is configured on the surface of the main body and includes a plurality of the illuminating components. The controlling circuit is electrically coupled to the illuminating component set and configured in a contained part of the main body. The controlling circuit includes a storage, a processor electrically connected to the storage, and a motion sensor coupled to the processor. The motion sensor generates a controlling signal while sensing an external force applied on the wearable object. The communication circuit is electrically coupled to the controlling circuit for receiving a picture transmitted by an input device outside of the wearable object into the storage. Wherein, the processor selectively drives the illuminating components to emit light according to the controlling signal and the picture.

In one embodiment, the main body is a shoe, the surface is a shoe surface of the shoe, and the contained part is a sole of the shoe. The motion sensor generates the controlling signal while sensing an external force applied on the shoe.

In one embodiment, when the plurality of the illuminating components are arranged in a two-dimensional array and the storage stores the picture with a string, the processor drives the plurality of the illuminating components to make the two-dimensional array to sequentially display each character in the string according to the controlling signal In one embodiment, the communication circuit receives an illuminating mode transmitted by the input device and stores the illuminating mode into the storage, and the processor drives the plurality of the illuminating components to sequentially display each character in the string according to the controlling signal, the string and the illuminating mode.

In one embodiment, the storage stores an illuminating color or a display frequency.

In one embodiment of the present invention, the plurality of illuminating components are arranged in a two-dimensional array, and the picture is a string which includes a first character to an Nth character. The processor sequentially selects an Xth character from the N characters according to the order of the received controlling signals and drives the plurality of illuminating components to display the Xth character, wherein X≤N.

In one embodiment, the communication circuit receives an illuminating mode transmitted by the input device and stores the illuminating mode into the storage. The processor selectively drives the illuminating components to emit light according to the controlling signal, picture and illuminating mode.

In one embodiment, the picture can be a text, a string, a symbol group or a graph.

In one embodiment, the processor ignores the controlling signal when the plurality of illuminating components have not displayed all characters in the string and the processor receives the controlling signal transmitted by the motion sensor.

In one embodiment, the processor re-drives the plurality of illuminating components to make the two-dimensional array to sequentially display each character in the string when the plurality of illuminating components have not displayed all characters in the string and the processor receives the controlling signal transmitted by the motion sensor.

In one embodiment, the communication circuit does not store the picture into the storage when the plurality of illuminating components have not displayed all characters in the string and the communication circuit receives another picture transmitted by the input device.

In one embodiment, the processor drives the plurality of illuminating components to display the first character when the processor receives the controlling signal transmitted by the motion sensor after driving the plurality of illuminating components to display the Nth character.

In one embodiment, the communication circuit stores another string into the storage when the communication circuit receives another string transmitted by the input device after the processor drives the plurality of illuminating components to display the Xth character.

In one embodiment, the processor drive the plurality of illuminating components to display an X+1th character of another string when receiving the controlling signal transmitted by the motion sensor after the communication circuit stores another string into the storage.

In one embodiment, the communication circuit matches an application program stored in the input device, and the communication circuit receives the picture and the illuminating mode transmitted by the application program through the input device.

In one embodiment, the motion sensor senses the motion state of the controlling circuit and outputs a motion parameter, and the storage further stores a threshold value. The processor finds the corresponding picture according to whether the motion parameter is greater than the threshold value and selectively drives the illuminating component to emit light according to the corresponding picture.

In one embodiment, the storage further stores N threshold values. The processor finds the corresponding picture according to the comparison result of the motion parameter and the threshold values to selectively drive the illuminating component to emit light, wherein N is a nature number greater than 1.

In one embodiment, the motion sensor is a speed sensor and the motion parameter is a speed parameter.

In one embodiment, the motion sensor is an acceleration sensor and the motion parameter is an acceleration parameter.

In one embodiment, the motion sensor is a vibration sensing component and the motion parameter is a vibration frequency parameter.

In one embodiment, the motion sensor is a displacement sensor and the motion parameter is a displacement parameter.

In one embodiment, the motion sensor is a distance sensor and the motion parameter is a distance parameter.

In one embodiment, the motion sensor is a tri-axial acceleration sensor. The tri-axial acceleration sensor generates controlling signal according to a moving direction of the wearable object. The processor drives the illuminating component to emit light according to the controlling signal and a corresponding sub-picture in the picture.

In one embodiment, the wearable object includes a sound circuit coupled to the controlling circuit. The motion sensor senses whether the external force applied on the wearable object is greater than a threshold value to selectively generate the controlling signal. The processor drives the sound circuit to play a preset sound according to the controlling signal, wherein, the preset sound is inputted and stored in the storage by the input device.

Compared with the prior art, the illuminating device and the wearable object of the present invention are connected to the input device and the illuminating device by the communication circuit. The user can easy to instantly input and control the picture and the illuminating mode by the interface of the input device without directly commanding the controlling circuit in the object. The illuminating device selects and displays the picture and the illuminating mode via remote instantly controlling input and the signal transmitted by the motion sensor when the wearer moves, thereby receiving correct and good decoration and warning effect, and solving previous technical problem.

The advantages and spirit of the present invention can be further understood by the following details of the invention and the drawings.

DETAILED DESCRIPTION OF THE INVENTION

For the sake of the advantages, spirits and features of the present invention can be understood more easily and clearly, the detailed descriptions and discussions will be made later by way of the embodiments and with reference of the diagrams. It is worth noting that these embodiments are merely representative embodiments of the present invention, wherein the specific methods, devices, conditions, materials and the like are not limited to the embodiments of the present invention or corresponding embodiments.

Figure 1:
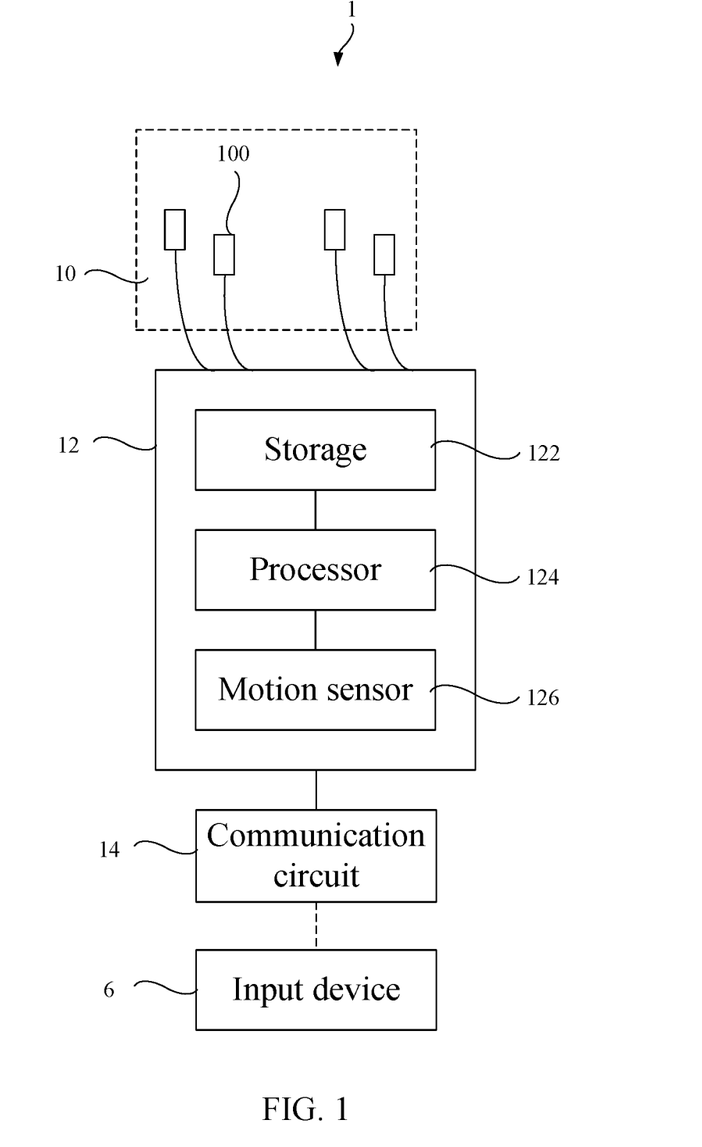
FIG. 1 is a schematic drawing illustrating an illuminating device according to an embodiment of the present invention.

Please refer to FIG. 1. FIG. 1 is a schematic drawing illustrating an illuminating device 1 according to an embodiment of the present invention. The illuminating device 1 of the present invention includes an illuminating component set 10, a controlling circuit 12 coupled to the illuminating component set 10 and a communication circuit 14 electrically coupled to the controlling circuit 12. The illuminating component set 10 includes a plurality of illuminating components 100. The controlling circuit 12 includes a storage 122, a processor 124 electrically connected to the storage 122 and a motion sensor 126 coupled to the processor 124. The motion sensor 126 generates a controlling signal while sensing an external force applied on the controlling circuit 12. The communication circuit 14 is configured for receiving a picture transmitted by an input device 6 outside of the illuminating device 1 and storing the picture into the storage 122. The processor 124 selectively drives the illuminating component 100 to emit light according to the controlling signal and the picture.

In one embodiment, the communication circuit 14 further receives an illuminating mode transmitted by the input device 6 and stores the illuminating mode into the storage 122. The processor 124 selectively drives the illuminating component 100 to emit light according to the controlling signal, the picture and the illuminating mode. In practical applications, the storage 122 can be a memory, and the processor 124 can be a central processing unit (CPU).

In one embodiment, the illuminating components 100 are arranged in a two-dimensional array. In one embodiment, in addition to the patterns, graphs or images, the picture also includes texts or strings in Chinese, English and other languages, or symbols such as exclamation marks, arrows, numbers, or prohibitions.

In one embodiment, the illuminating mode is composed of at least one of a lighting color, a counting mode, a flashing frequency, a word amount display, duration, an animation effect, a display frequency, and a predetermined amount of pixels displayed in a picture. The lighting color means that the illuminating component 100 emits light with different colors according to the pre-determined illuminating mode. The counting mode means that if the picture is in multiple sets of numbers, the illuminating component set 10 sequentially displays the numbers according to the preset counting order of the illuminating mode. The word amount display means that if the picture is a plurality of words, the illuminating component set 10 sequentially displays the quantified number of the words according to the illuminating mode. The animation effect means that the illuminating component set 10 gives a special effect such as magnification, minification, moving, shaking, turning, picture fading-in or fading-out according to the preset effect of the illuminating mode. The display frequency means that the displaying duration of the picture for each time of receiving the controlling signal; or the interval time of each word and the next word when sequentially displaying a plurality of words; or the interval time of each frame and the next frame when displaying animations or displaying words in the special effect. The predetermined amount of pixels of the picture means that the illuminating component set 10 only displays a portion of the picture, such as only displaying the part picture with 50*50 pixels of the picture with 100*100 pixels. Furthermore, the predetermined amount of pixels can be shown from the portion to the whole picture, such as gradually magnifying from the part of the picture with 10*10 pixels to 100*100 pixels; or sequentially displaying a portion to display the whole picture.

In one embodiment, the communication circuit 14 receives the controlling signal sent and generated by the input device 6, then transmits the controlling signal to the processor 124. In one embodiment, the input device 6 stores an application program, and the communication circuit 14 receives the picture, the controlling signal and an illuminating mode transmitted by the application program through the input device 6.

The input device 6 can be a smart phone, a simple computer, a controller to input texts, strings, symbols or graphs. The input device 6 is connected to the communication circuit 14 in wired connection or wireless connection. In one embodiment, the input device 6 is a cell-phone which is wirelessly connected to the communication circuit 14, such as Wi-Fi (Wireless Fidelity), Bluetooth or NFC (Near Field Communication).

In one embodiment, the plurality of illuminating components 100 are arranged in a two-dimensional array. The processor 124 drives the plurality of illuminating components 100 according to the controlling signal to make the two-dimensional array to sequentially display each character in the string.

In one embodiment, the processor 124 ignores the controlling signal if the processor 124 receives the controlling signal transmitted by the motion sensor 126 when the plurality of illuminating components 100 have not sequentially displayed all characters in the string. In another one embodiment, the communication circuit 14 ignores the controlling signal if the communication circuit 14 receives the controlling signal transmitted by the motion sensor 126 when the plurality of illuminating components 100 have not sequentially displayed all characters in the string. In other words, the processor 124 receives new controlling signal after the plurality of illuminating components 100 displays the complete string.

In another one embodiment, the processor 124 re-drives the plurality of illuminating components 100 to make the two-dimensional array to sequentially display each character in the string if the processor 124 receives the controlling signal transmitted by the motion sensor 126 when the plurality of illuminating components 100 have not sequentially displayed all characters in the string. In other one embodiment, when the plurality of illuminating components 100 have not sequentially displayed all characters in the string and the controlling signal is transmitted by the motion sensor 126 to the processor 124, the processor 124 re-drives the plurality of illuminating components 100 to sequentially display each character in the string. Taking a string of "GLOW" for example, when the illuminating component 100 sequentially emits light from "G" to "O" and receives a controlling signal, it will immediately start to emit light from "G".

In another one embodiment, when the plurality of illuminating components 100 have not sequentially displayed all characters in the string and the processor 124 receives the controlling signal transmitted by the motion sensor 126, the processor 124 drives the illuminating component 100 to complete the display of the ongoing string, and then redisplays each character in the string.

In one embodiment, when the plurality of illuminating components 100 have not sequentially displayed all characters in the string and the communication circuit 14 receives another picture transmitted by the input device 6, the communication circuit 14 does not store the picture into the storage 122. The processor 124 receives another picture when the illuminating components 100 display the complete string.

In other one embodiment, the communication circuit 14 ignores another picture transmitted by the input device 6 when the plurality of illuminating components 100 have not sequentially displayed all characters in the string.

In one embodiment, when the plurality of illuminating components 100 have not sequentially displayed all characters in the string and the communication circuit 14 receives another picture transmitted by the input device 6, the communication circuit 14 stores another picture into the storage 122 and immediately replaces the original picture. At this time, the illuminating component 100 may then display the new picture or wait for next controlling signal to display the new picture.

In another one embodiment, when the plurality of illuminating components 100 have not sequentially displayed all characters in the string the communication circuit 14 receives another picture transmitted by the input device 6, the communication circuit 14 stores another picture into the storage 122 coexisting with the original picture, wherein there are different starting threshold values or conditions for the original picture and the another picture.

In one embodiment, the plurality of illuminating components 100 are arranged in a two-dimensional array. When the picture is a string which includes a first character to an Nth character, the processor 124 sequentially selects an Xth character from the N characters according to each received controlling signal and drives the plurality of illuminating components 100 to display the Xth character, wherein $X \leq N$. For example, a string "GLOWINGSHOES" includes the first character to 12th character, and then the processor 124 drives the illuminating component 100 to display "G" when receives the first controlling signal, drives the illuminating component 100 to display "L" when receives the second controlling signal, drives the illuminating component 100 to display "O" when receives the third controlling signal, and so on.

In other one embodiment, the plurality of illuminating components 100 are arranged in a two-dimensional array and the storage 122 stores the string and the string includes a first character to an Nth character, when the processor 124 sequentially receives a plurality of controlling signals, the processor 124 correspondingly and sequentially selects an Xth character from the N characters and drives the plurality of illuminating components 100 to display the Xth character, wherein X≤N.

In one embodiment, after the processor 124 drives the plurality of the illuminating components 100 to display the Nth character, the processor 124 drives the plurality of the illuminating components 100 to display the first character if the processor 124 receives the controlling signal transmitted by the motion sensor 126. In other one embodiment, after the processor 124 drives the plurality of the illuminating components 100 to display the Nth character, the processor 124 then displaying the first character in the event the processor further receives a first controlling signal. For the above mentioned examples, after the processor 124 receives the 12th controlling signal to make the illuminating component 100 display the 12th character "S", the illuminating component 100 displays the first character "G" again when the processor 124 receives the controlling signal. Therefore, the string can be displayed cyclically without stopping.

In one embodiment, the communication circuit 14 does not receive another picture, graph or string transmitted by the input device 6 until the processor 124 completes driving the plurality of illuminating components 100 to display the Nth character.

In one embodiment, after the processor 124 drives the plurality of illuminating components 100 to display the Xth character, the communication circuit 14 stores another string into the storage 122 if the communication circuit 14 receives another string transmitted by the input device 6. For example, when the illuminating component set 10 is displaying the character "L" of the string "GLOWING" and the communication circuit 14 receives another string "ILLUMINING" at the same time, the string "ILLUMINING" will be stored into the storage 122. At this time, when the processor 124 receives the next controlling signal, the processor 124 can drive the illuminating component set 10 to display the character "I" of the string "ILLUMINING"; or drive the illuminating component set 10 to continue displaying the character "O", "W", "I" and so on, of the original string "GLOWING", and the illuminating component set 10 displays the character "I" of the string "ILLUMINING" after the illuminating component set 10 sequentially displays the complete string and receives the controlling signal.

In one embodiment, after the communication circuit 14 stores another string into the storage 122, the processor 124 drives the plurality of illuminating components 100 to display the X+1th character of another string if the processor 124 receives the controlling signal transmitted by the motion sensor 126. In other one embodiment, after the communication circuit 14 stores another string into the storage 122, the processor 124 then driving the plurality of illuminating components 100 to display an X+1th character of another string in the event the processor 124 receives a second controlling signal. For example, when the illuminating component set 10 is displaying the second character "L" of the string "GLOWING" and the communication circuit receives another string "ILLUMINING" at the same time, the processor 124 drives the illuminating component 100 to display the third character "L" of the string "ILLUMINING" if the processor 124 receives the controlling signal.

In one embodiment, the controlling signal can be transmitted by the input device 6. When the processor 124 is driving the illuminating component 100 to emit light, the input device 6 cannot input the controlling signal to immediately replace the picture and the illuminating mode; but once the processor 124 stops to drive the illuminating component 100 to emit light, the input device 6 can input the controlling signal to immediately replace the next picture and the illuminating mode.

In another one embodiment, the input device 6 can input the controlling signal to immediately replace the picture and the illuminating mode when the processor 124 is driving the illuminating component 100 to emit light. In another one embodiment, when the processor 124 is driving the illuminating component 100 to emit light, the input device 6 can input the controlling signal, picture and illuminating mode, and the illuminating component set 10 continue displaying the current picture and illuminating mode until finishing this lighting cycle. After stopping this lighting cycle, the processor 124 will drive the illuminating component set 10 to emit light with the new picture and illuminating mode in the next cycle.

In another one embodiment, the input device 6 is a notebook computer which is connected to the communication circuit 14 in wired connection by a USB device. The aforementioned wired connection method is for a user to input the picture or illuminating mode to the illuminating device 1 through the input device 6. However, the connection between the input device 6 and the communication circuit 14 can be removed when the illuminating device 1 in the moving state, so as to enable the user to carry the illuminating device 1 without the input device 6.

The cell-phone can pre-store an APP to provide an operating interface for a user, and the user can control the illuminating device 1 by the operating interface immediately or in a predetermined way. Therefore, it will more convenient for the user to input the picture and illuminating mode and to control the illuminating device 1.

The motion sensor 126 of the illuminating device 1 of the present invention further outputs a motion parameter. The processor 124 generates the controlling signal according to whether the motion parameter is greater than a threshold value stored in the storage 122, and then the processor 124 finds the corresponding picture and illuminating mode and selectively drives the illuminating component 100 to emit light according to the corresponding picture and illuminating mode.

Figure 2:
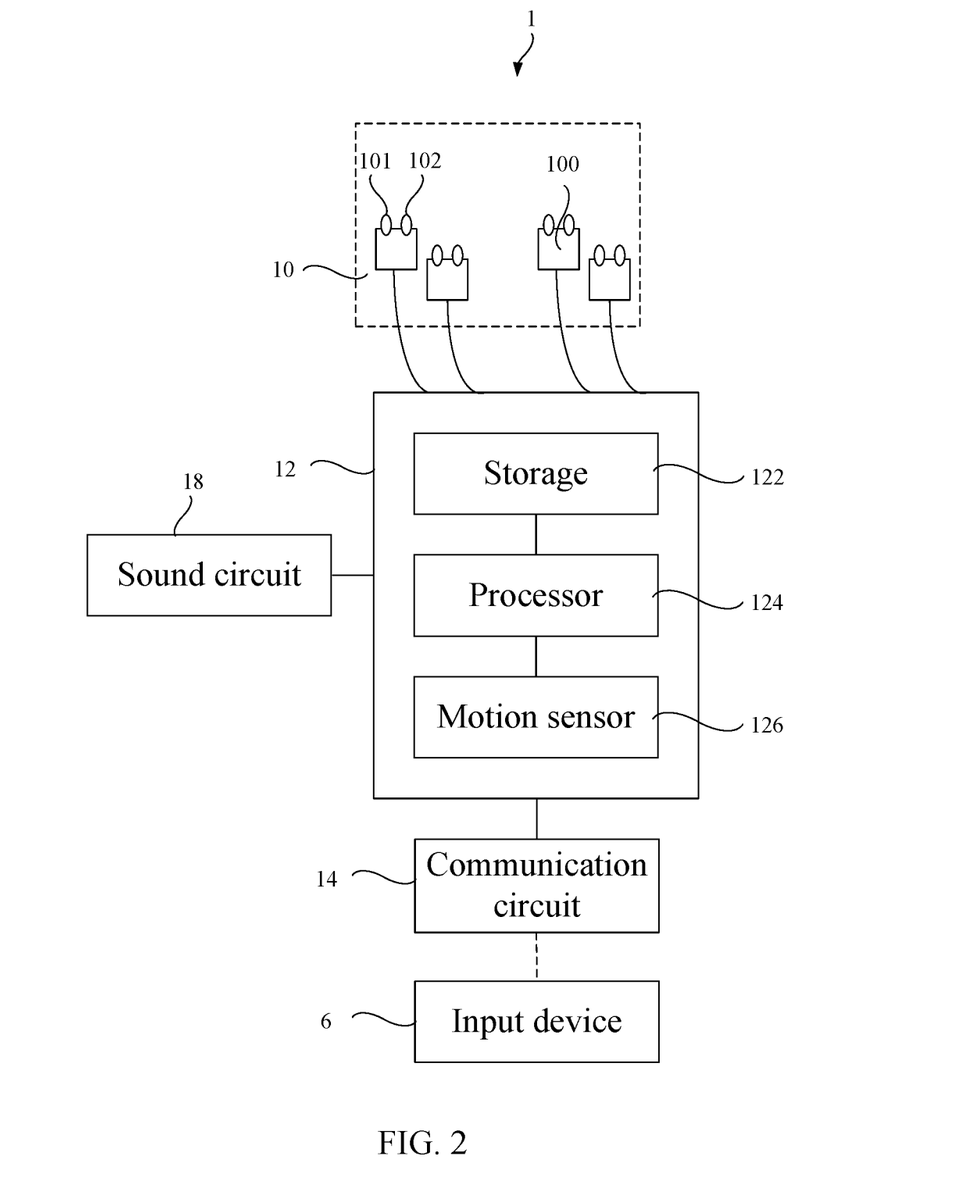
FIG. 2 is a schematic drawing illustrating the illuminating device according to another embodiment of the present invention.

Please refer to FIG. 2. FIG. 2 is a schematic drawing illustrating the illuminating device according to another embodiment of the present invention. The illuminating component 100 is a light emitting diode unit, and the light emitting diode unit can include a first light emitting diode 101 and a second light emitting diode 102 lighting with different colors. In practical applications, the colors of two light emitting diodes can be easily distinguished. For example, the color of the first light emitting diode 101 is green, and the color of the second light emitting diode 101 is red. However, the present invention is not limited to these two colors. Each illuminating component 100 also can include three or more light emitting diodes with different light colors. For example, each illuminating component 100 includes seven light emitting diodes that emit red, orange, yellow, green, blue, indigo and violet, respectively.

In one embodiment, the illuminating device 1 further includes a sound circuit 18 coupled to the controlling circuit 12. The storage 122 further stores a plurality of sounds. The sound can be those capable of being received by the auditory organs such as music, sound effect, languages, and so on. In one embodiment, when the communication circuit 14 remotely communicates to the input device 6, the processor 124 drives the illuminating component 100 to emit light and drives the sound circuit 18 to play sound according to the controlling signal of the input device 6.

In another one embodiment, the processor 124 selectively drives the sound circuit 18 to play the corresponding sound according to whether the motion parameter is greater than the threshold value. When the motion sensor 126 senses the motion state and outputs a motion parameter, the processor 124 commands the sound circuit 18 to play the sound stored in the storage 122 according to whether the motion parameter is greater or less than the threshold value. In one embodiment, the storage 122 stores sounds of "warning" and "attention". The motion sensor 126 is a speed sensor, and the threshold values can be 10 km/hr and 30 km/hr respectively. When the controlling circuit 12 moves with a speed between 10 km/hr and 30 km/hr, the processor 124 selectively drives the sound circuit 18 to play the "attention" sound; and when the controlling circuit 12 moves with a speed over 30 km/hr, the processor 124 selectively drives the sound circuit 18 to play the "warning" sound.

Figure 3:
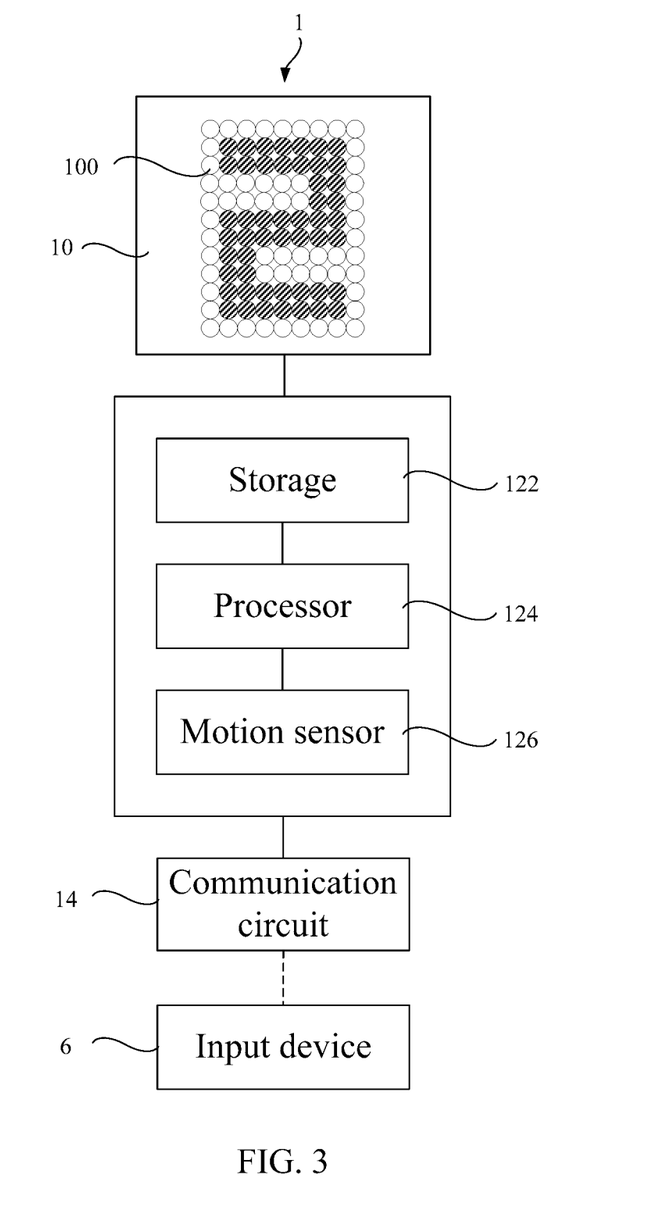
FIG. 3 is a schematic drawing illustrating the illuminating device according to another embodiment of the present invention.

Please refer to FIG. 3. FIG. 3 is a schematic drawing illustrating the illuminating device according to another embodiment of the present invention. In one embodiment, the storage 122 stores a numeric string of 0, 1, 2, 3 . . . 100. The motion sensor 126 is configured for sensing the vibration. The illuminating component set 10 includes fifteen illuminating components 100 which arranged in an array with 3 rows and 5 columns. In the beginning, the processor 124 selectively drives a part of the illuminating components 100 to emit light to enable the illuminating component set 10 to display the number "0". When the motion sensor 126 senses the vibration of the controlling circuit 12, it outputs a motion parameter according to the intensity of the vibration. The processor 124 further drives the part of the illuminating components 100 to emit light to enable the illuminating component set 10 to display the number "1" after determining the motion parameter as being larger than the threshold value stored in the storage 122. According to the same procedure, the processor 124 drives the illuminating component set 10 to sequentially display "2", "3", "4" . . . "100" at each time when the motion parameter of the intensity of vibration is greater than the threshold value.

In one embodiment, the illuminating mode A is to emit green light and flash every 8 seconds, and the picture A is "safe"; the illuminating mode B is to emit red light and flashes every 3 seconds, and the picture B is "dangerous". When the controlling circuit 12 moves in a speed lower than the threshold value, the illuminating component set 10 displays the text "safe" with green light and flashes every 8 seconds; when the controlling circuit 12 moves in a speed higher than the threshold value, the illuminating component set 10 displays the text "dangerous" with red light and flashes every 3 seconds. In one embodiment, the lighting color of the illuminating mode also includes a change of the lighting brightness. In practical applications, the illuminating component set 10 emits red light with low brightness when the controlling circuit 12 moves in a speed lower than the threshold value; and the illuminating component set 10 emits red light with high brightness when the controlling circuit 12 moves in a speed higher than the threshold value.

Furthermore, the picture, illuminating mode or threshold value can be inputted into the storage 122 by the input device 6. In one embodiment, the input device 6 is connected to the storage 122 of the controlling circuit 12 through the communication circuit 14. The user inputs the information of picture A, picture B, illuminating mode A, illuminating mode B and threshold value in the input device 6 and stores them into the storage 122.

The controlling circuit 12 can sequentially and selectively drives the illuminating component 100 to display the complete picture. In one embodiment, the illuminating mode B is to emit a red light which flashes every 3 seconds and to display two words, and the picture B is "dangerous attention". When the controlling circuit 12 moves in a speed higher than the threshold value, the processor 124 drives the illuminating component set 10 in the illuminating mode B and the picture B manner to take turns to display the words "dangerous" and "attention" with red light flashing once every 3 seconds. In another embodiment, an illuminating mode is to emit a white light and selectively drives the illuminating component set 10 five times per second to display from the part of the pixels to the complete pixels of the picture. The processor 124 drives the illuminating component 100 to instantly light or extinguish in the illuminating mode C and picture B way to enable the illuminating component set 10 to emit in marquee state when the controlling circuit 12 moves in a speed with higher than the threshold value. That is to say, it looks like the "danger attention" of the picture B moved from the right side of the array of the illuminating component set 10 to the left side, so as to display the complete picture.

The storage 122 further stores M threshold values, and the processor 124 finds the corresponding picture according to the comparison result of the motion parameter and the threshold value to selectively drive the illuminating component 100 to emit light, wherein M is a nature number greater than 1. In one embodiment, the motion sensor 126 is a speed sensor, and the motion parameter is a speed parameter. The motion sensor 126 is for detecting the moving speed of the controlling circuit 12, and the unit of measurement of the motion parameter and its corresponding threshold value is m/s or km/hr. In one embodiment, the threshold values are 10 km/hr, 30 km/hr and 50 km/hr.

In one embodiment, when the processor 124 is driving the illuminating component 100 to emit light, the input device 6 cannot input the threshold value to immediately change the threshold value; but when the processor 124 stops driving the illuminating component 100 to emit light, the input device 6 can input the next threshold value.

In one embodiment, when the processor 124 is driving the illuminating component 100 to emit light, the input device 6 can input M threshold values. The processor 124 timely determines whether the motion coefficient is greater than the threshold value so as to timely change the picture and the illuminating mode.

In one embodiment, when the processor 124 is driving the illuminating component 100 to emit light, the input device 6 can input M threshold values, picture and illuminating mode, and the illuminating component set 10 continue displaying the current picture and illuminating mode to finish this lighting cycle. After the processor 124 stops this light cycle, the processor 124 determines whether the current motion coefficient is greater than any threshold value, and then the drives the illuminating component set 10 to emit light with the new picture and illuminating mode.

In one embodiment, the storage 122 will overwrite the threshold value, picture or illuminating mode stored in the storage 122 when receiving the threshold value, picture or illuminating mode from the input device 6.

In another embodiment, when the storage 122 receives the threshold value, picture or illuminating mode from the input device 6, the storage 122 will store them into other storage locations of the storage 122, or partial overwrite the original threshold value, picture or illuminating mode.

In practical applications, the user can input the information of the picture A, picture B, picture C, illuminating mode A, illuminating mode B, illuminating mode C, threshold value A' and threshold value B' into the input device 6 and stores them into the storage 122, wherein the threshold value A' and threshold value B' are the speed parameters of the same type and the threshold value B' is greater than the threshold value A'. When the controlling circuit 12 moves in a speed lower than the threshold value A', the processor 124 selectively drives the illuminating component 100 to emit light to enable the illuminating component set 10 displays picture A with illuminating mode A; when the controlling circuit 12 moves in a speed higher than the threshold value B', the processor 124 selectively drives the illuminating component 100 to emit light to enable the illuminating component set 10 displays picture C with illuminating mode C; when the controlling circuit 12 moves in a speed between the threshold value A' and the threshold value B', the processor 124 selectively drives the illuminating component 100 to emit light to enable the illuminating component set 10 displays picture B with illuminating mode B.

In one embodiment, the motion sensor 126 is a vibration sensing component, and the motion parameter is a vibration signal. The motion sensor 126 outputs a vibration signal when detecting the vibration of the controlling circuit 12. The processor 126 drives the illuminating component set 10 to emit light when receiving the vibration signal.

In another one embodiment, the motion sensor 126 is a vibration sensing component, and the motion parameter is a vibration frequency parameter. At this time, the motion sensor 126 is configured for detecting the vibration frequency of the controlling circuit 12, and the unit of measurement of the motion parameter and its corresponding threshold value is (times/second) or (times/minute). In another one embodiment, the motion sensor 126 is a vibration sensing component, and the motion parameter is a vibration intensity parameter. At this time, the motion sensor 126 is configured for detecting the vibration intensity of the controlling circuit 12.

In another one embodiment, the motion sensor 126 is an acceleration sensor, and the motion parameter is an acceleration parameter. The acceleration sensor can be one-axial, two-axial or tri-axial acceleration sensor. If the acceleration sensor is a one-axial acceleration sensor, it can detect the acceleration and deceleration on the linear vector of the controlling circuit 12; if the acceleration sensor is a two-axial acceleration sensor, it can detect the acceleration, deceleration and turning on the plane of the controlling circuit 12; if the acceleration sensor is a tri-axial acceleration sensor, it can detect the acceleration, deceleration, turning, tilting and rotation of the controlling circuit 12 in any direction.

In another one embodiment, the motion sensor 126 is a distance sensor and the motion parameter is a frequency parameter. At this time, the motion sensor 126 is configured for detecting the distance between the controlling circuit 12 and ambient objects. It is counted as one time if the motion sensor 126 detects that the distance between the controlling circuit 12 and an object is less than a certain distance first and then becomes greater than a certain distance after a time interval. The unit of measurement of the motion parameter and its corresponding threshold value is (times/second) or (times/minute).

In another one embodiment, the motion sensor 126 is a displacement sensor and the motion parameter is a displacement parameter. At this time, the motion sensor 126 is configured for detecting the displacement of the controlling circuit 12 in a period, and the unit of measurement of the motion parameter and its corresponding threshold value is (meters/second) or (meters/minute).

Figure 4:
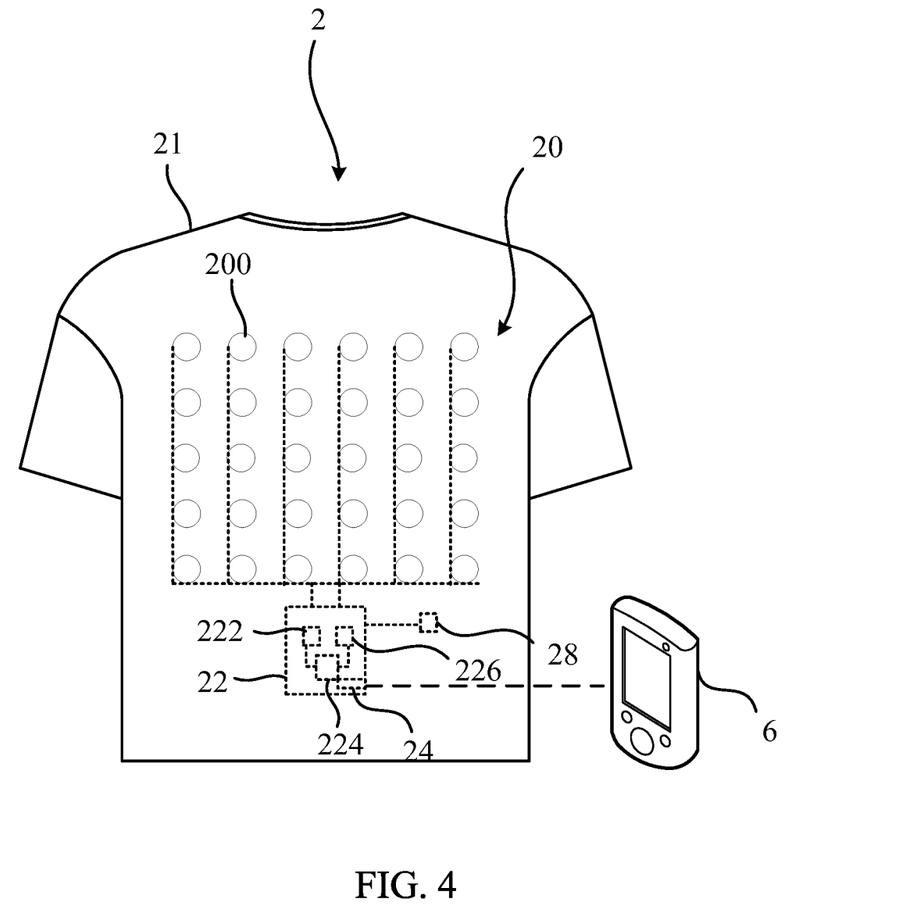
FIG. 4 is a schematic drawing illustrating a wearable object according to an embodiment of the present invention.
Figure 7:
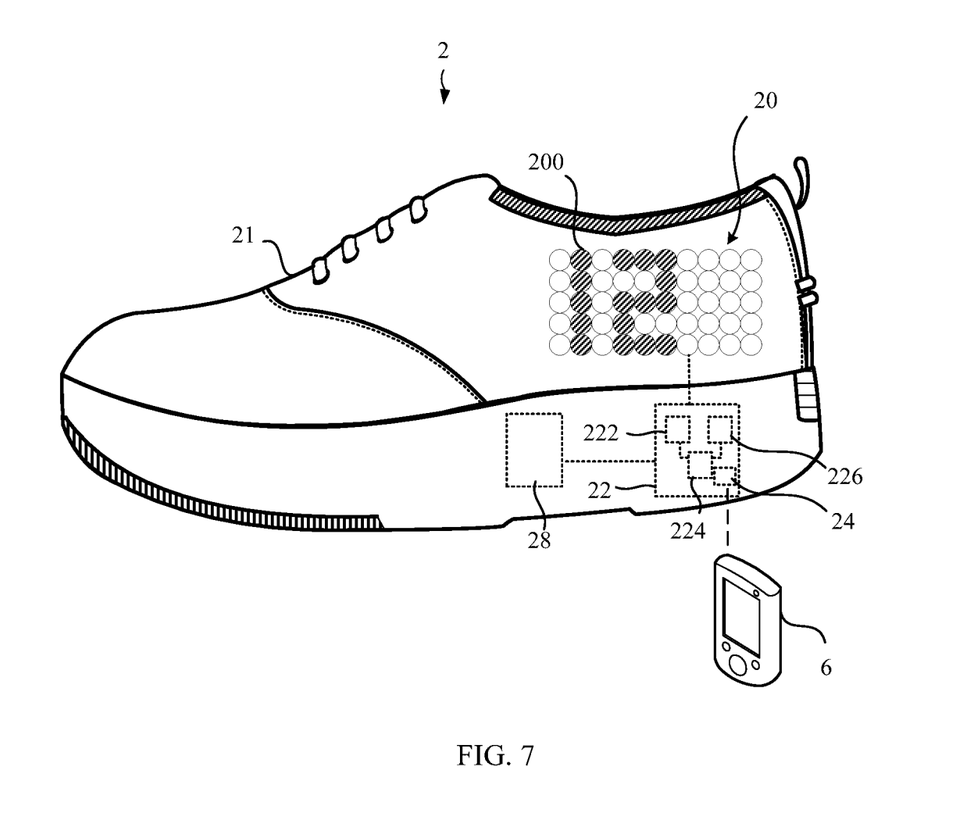
FIG. 7 is a schematic drawing illustrating the wearable object according to another embodiment of the present invention.

Please refer to FIG. 4 and FIG. 7. FIG. 4 is a schematic drawing illustrating a wearable object 2 according to an embodiment of the present invention. FIG. 7 is a schematic drawing illustrating the wearable object 2 according to another embodiment of the present invention. Another aspect proposed by the present invention is a wearable object 2 with lighting function, which includes a main body 21, an illuminating component set 20, a controlling circuit 22 and a communication circuit 24. The illuminating component set 20 is configured on the surface of the main body 21 and includes a plurality of the illuminating component 200. The controlling circuit 22 is electrically coupled to the illuminating component set 20 and is configured in a contained part of the main body 21. The controlling circuit 22 includes a storage 222, a processor 224 electrically connected to the storage 222 and a motion sensor 226 coupled to the processor 224. The motion sensor 226 generates a controlling signal while sensing an external force applied on the wearable object 2. The communication circuit 24 is connected to the controlling circuit 22 for receiving a picture transmitted by an input device 6 outside of the wearable object 2 of the storage 222. The processor 224 selectively drives the illuminating components 220 to emit light according to the controlling signal and the picture.

In this embodiment, the wearable object 2 is an assembly of the illuminating component set 20, the controlling circuit 22, the communication circuit 24 and a main body 21. However, in this embodiment, the illuminating mode, the picture, the threshold value, the controlling signal, the illuminating component set 20, the illuminating component 200, the controlling circuit 22, the storage 222, the sound circuit 28, the processor 224 and the motion sensor 226 are the same as the corresponding components of the illuminating device 1 of the above mentioned embodiments, so the details would not be described again.

In practical applications, the illuminating component set 20 and the controlling circuit 22 can be configured on one main body 21 at the same time, or can be configured on different main bodies 21. The illuminating component set 20 can be directly configured on the outer surface of the main body 21, or can be configured under the light transmissive surface.

In one embodiment, the motion sensor 226 can be used for sensing the illuminating component set 20, the main body 21, the controlling circuit 22 or the motion change or external force of the communication circuit 24, especially the containing space of the main body 21.

As shown in FIG. 7, in one embodiment, the main body 21 is a shoe, the surface is a shoe surface of the shoe, and the contained part is a sole of the shoe. The motion sensor 226 generates the controlling signal when sensing the external force is applied on the shoe. The external force especially means the vibration, inertia change, gravity or acceleration generated by a user walking with the shoe of the present invention.

In one embodiment, the communication circuit 24 of the wearable object 2 remotely communicates to the input device 6, and the processor 224 selectively drives the illuminating components 200 to emit light according to the controlling signal of the input device 6.

As shown in FIG. 4, in one embodiment, the main body 21 is the clothes for the rider during riding a bike, wherein, the illuminating component set 20 can be configured on both of the front side and the back side of the clothes. In another embodiment, the motion sensor is a tri-axial acceleration sensor, and the tri-axial acceleration sensor generates the controlling signal according to a moving direction of the wearable object 2. The processor 224 drives the illuminating component 200 to emit light according to the controlling signal and a corresponding sub-picture of the picture.

In this embodiment, the illuminating component set 20 is configured on the outer surface of the back side of the clothes, the controlling circuit 22 is configured in the contained part of the inner surface of the back side of the clothes, and the motion sensor 226 is a tri-axial acceleration sensor. When the rider leans to turn right, the motion sensor 226 detects a turning right acceleration and transmits an acceleration parameter to the processor 224. The processor 224 determines the parameter greater than a threshold value stored in the storage 222 first, and then searches a picture with "right arrow" and an illuminating mode stored in the storage and selectively drives the illuminating component 200 to emit light to remind the rear passerby that the rider is turning right. Thereby, the rider does not need to give a command through the button or switch; the present invention can automatically selects and displays the picture and the illuminating mode according to the change of the motion. In one embodiment, the picture "right arrow" and the illuminating mode can be inputted to the storage 222 by the input device 6 with an APP.

Please refer to FIG. 7. In another one embodiment, the main body 21 is a tap dance shoe worn by the dancer for dancing, wherein the controlling circuit 22 is configured on the heel or the bottom of the shoe, but the illuminating component set 20 is configured on the surface of the shoe. The motion sensor 226 is a vibration sensor for sensing the external force on the shoe generated by the stepping of the dancer. When the dancer dances, the motion sensor 226 detects a vibration and transmits a vibration parameter to the processor 224. The processor 224 searches a picture of "0, 1, 2, 3 . . . 100" and an illuminating mode stored in the storage 222 after receiving the parameter and selectively drives the illuminating component 200 to emit light to enable the illuminating component set 20 of the surface of the shoe to show the numbers increasing along with the vibration and the changes of the lighting color, so as to achieve aesthetics and to provide more information for the viewer.

At the same time, the processor 224 also can search the sounds of "0, 1, 2, 3 . . . 100" stored in the storage 222 and selectively drive the sound circuit 28 to play the incremental number sounds with the vibration. In one embodiment, the pictures of "0, 1, 2, 3 . . . 100" and the lighting colors can be remotely stored into the storage 222 through the input device 6 with an APP.

Figure 5:
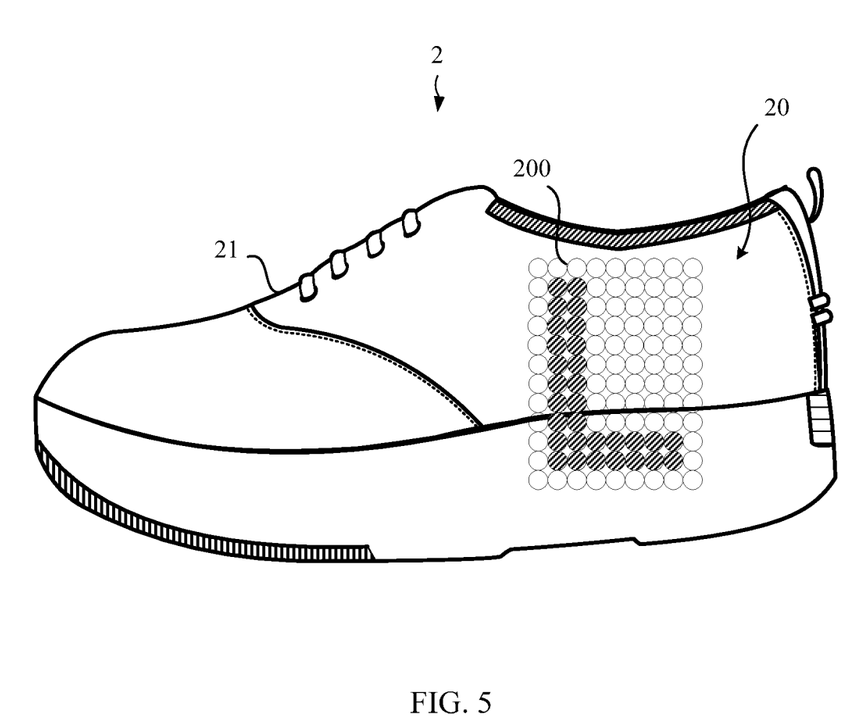
FIG. 5 is a schematic drawing illustrating an illuminating mode of the wearable object according to an embodiment of the present invention.
Figure 6:
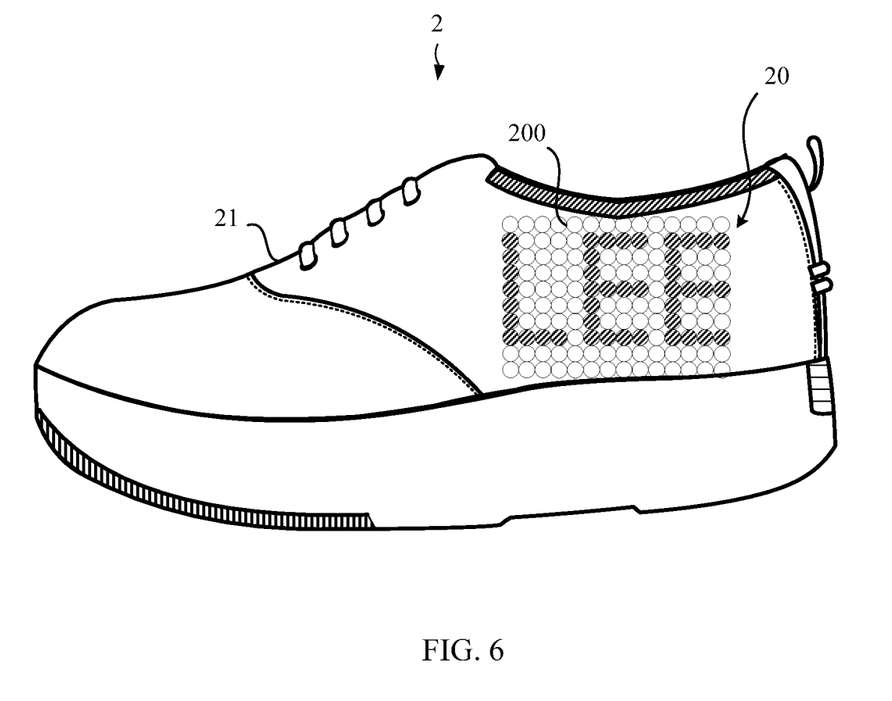
FIG. 6 is a schematic drawing illustrating the illuminating mode of the wearable object according to another embodiment of the present invention.

Please refer to FIG. 5 and FIG. 6. FIG. 5 is a schematic drawing illustrating an illuminating mode of the wearable object 2 according to an embodiment of the present invention. FIG. 6 is a schematic drawing illustrating the illuminating mode of the wearable object 2 according to another embodiment of the present invention. In addition, the illuminating mode can display a single character in one time, display multiple characters in one time, display multiple characters in many times, and so on. In one embodiment, as shown in FIG. 5, when the illuminating mode is to display a single character in one time, the controlling circuit 22 will drive the illuminating component set 20 to display a picture "LEE", which would display "L", "E" and "E" respectively; wherein, the illuminating component 200 illustrated with slash represents that the illuminating component 200 is emitting light. In another one embodiment, as shown in FIG. 6, when the illuminating mode is to display multiple characters in one time, the controlling circuit 22 drives the illuminating component set 20 to simultaneously display a picture with "LEE" to enable the illuminating component set 20 to simultaneously display "LEE". In one embodiment, the pictures with "LEE", "L", "E", "E" and the illuminating mode can be remotely set in the wearable object 2 through the input device 6 with an APP.

Please refer to FIG. 7 again. Furthermore, the size of the picture shown on the illuminating component set 20 can be changed according to the detected results of the motion sensor 226. For example, the font size is increased when the detected vibration frequency is greater or the detected vibration intensity is greater. Furthermore, the flash frequency of the picture can be changed according to the detected results of the motion sensor 226. For example, the flash frequency of the picture is increased when the detected speed is greater or the detected vibration frequency is greater. Furthermore, the moving speed of the picture can be changed according to the detected results by the motion sensor 226 when the picture shown in a marquee way. For example, the moving speed of the picture is increased when the detected speed is greater or the detected vibration frequency is greater. Moreover, the picture can remain the same but changing colors according to the illuminating mode. For example, the picture is white when the motion sensor 226 senses a low speed; the picture is yellow when the motion sensor 226 senses a middle speed; and the picture is red when the motion sensor 226 senses a high speed.

In above mentioned embodiments, the wearable object 2 can be wirelessly connected to the input device 6 installing the corresponding APP through the communication circuit 24. The user remotely inputs the illuminating mode, the picture and the threshold value to the storage 222 of the controlling circuit 22 through the input device 6. In practical applications, the wearable object 2 also can timely receives the remote settings when the wearer is moving without directly giving commands to the controlling circuit in the object. For example, when the wearable object 2 is a pair of shoes and the user walks with the wearable object 2, the user can turn on the APP of the handheld input device 6 to control the illuminating mode, the picture and the threshold value of the wearable object 2 to timely change the lighting effects of the shoes.

In another one embodiment, the main body 21 is a pair of sports shoes for a user to exercise, wherein the controlling circuit 22 is configured on the heel or the bottom of the shoes and the illuminating component set 20 is configured on the surface of the shoes. The motion sensor 226 is a vibration sensor for sensing the external force generated by grounding of the shoes to transmit the controlling signal. When the user is running, the illuminating component set 20 displays the preset picture and string "RUNNING" with the steps, and displays the illuminating mode with one character in each step to sequentially display "R", "U", "N", and so on. The user simultaneously controls a smart phone as an input device 6, and the smart phone pre-stores the APP corresponding to the wearable object 2. The user inputs a new picture and string "GOING" and a new illuminating mode to the storage 222. The illuminating component set 20 sequentially displays each character of "GOING" of the picture and string in every step after the motion sensor 226 detects the user's next step.

In above mentioned embodiments, the main body 21 is the shoes and clothes, but the main body 21 also can be any wearable objects such as a pair of pants, a jacket, a hat, a backpack, a waist bag, a school bag, a wrist cover, and the like in practice. In practical applications, the illuminating component set 20 can be arranged in the two-dimensional array, also can be the linear or three-dimensional array according to the different purposes of the wearing objects to adapt to a variety of wearing objects.

In summary, the illuminating device of the present invention includes the illuminating component set, the communication circuit and the controlling circuit, wherein the controlling circuit is coupled to the illuminating component set. The controlling circuit includes the processor, the motion sensor and the storage. The motion sensor can sense the motion state of the controlling circuit and output the motion parameter, and the storage stores multiple pictures, illuminating modes and at least one threshold values. The processor selectively drives the illuminating component set to emit light in an illuminating mode to form a picture according to whether the motion parameter is over the threshold value. The communication circuit is coupled to the processor for receiving the picture, illuminating mode and threshold value inputted by an input device and can remotely control the illuminating component set to emit light. The illuminating device can be applied on the wearable objects to achieve well decorations and warning effects.

Compared with the prior art, the illuminating device and the wearable object of the present invention are connected to the input device and the illuminating device through the communication circuit. The user can easily and timely input and control the pictures and illuminating modes by the interface of the input device without directly giving commands to the controlling circuit of the objects. Furthermore, when the wearer is moving, the illuminating device selects and displays the picture and the illuminating mode according to the timely remote controlling input and the signal transmitted by the motion sensor, so as to receive correct and good decorations and warning effects to solve the problems of the prior art.

The features and spirits of the present invention are hopefully described more clearly by the above detailed description of the preferred embodiments, and the scope of the present invention is not limited by the preferred embodiments disclosed above. On the contrary, the purpose is to cover a variety of changes and equivalence arrangements within the scope of the patent application to be applied for by the creative institute. Although the present invention has been disclosed in the above embodiments, it is not intended to limit the present invention, and anyone skilled in the art can make various changes and refinements without departing from the spirit and scope of the present invention. Therefore, the scope of protection of this present invention is subject to the definition of the scope of the patent application attached.

What is claimed is:

1. An illuminating device configured to be embedded in a wearable object, comprising:
    an illuminating component set comprising a plurality of illuminating components;
    a controlling circuit coupled to the illuminating component set and configured to be embedded in the wearable object, the controlling circuit comprising:
    a storage;
    a processor electrically connected to the storage; and
    a motion sensor coupled to the processor, the motion sensor generating a controlling signal while sensing an external force applied on the controlling circuit; and
    a communication circuit electrically coupled to the controlling circuit, the communication circuit wirelessly receiving a picture transmitted by an input device outside of the illuminating device and storing the picture into the storage, wherein the picture comprising a plurality of sub-pictures, and each of the sub-pictures at least comprises a character;
    wherein the processor selectively drives the illuminating components to sequentially or simultaneously display each of the plurality of sub-pictures according to the controlling signal, and the processor selectively controls a size of each of the sub-pictures, a flash frequency of the sub-pictures, and/or a moving speed of the sub-pictures shown on the illuminating component set according to a detected result, the detected result is corresponding to at least one physical parameter of the controlling circuit.

2. The illuminating device of claim 1, wherein the communication circuit further receives an illuminating mode transmitted by the input device and stores the illuminating mode into the storage, and the processor selectively drives the illuminating components to emit light according to the controlling signal, the picture and the illuminating mode.

3. The illuminating device of claim 2, wherein the storage stores an illuminating color, a display frequency, or a predetermined amount of pixels in the picture.

4. The illuminating device of claim 1, wherein the storage stores the picture which comprises a text, a string, a symbol group or a graphic.

5. The illuminating device of claim 4, wherein the plurality of illuminating components are arranged in a two-dimensional array, when the storage stores the string, the processor drives the plurality of illuminating components according to the controlling signal to make the two-dimensional array to sequentially display each character in the string.

6. The illuminating device of claim 5, wherein the processor ignores the controlling signal transmitted by the motion sensor when the plurality of illuminating components have not sequentially displayed all characters in the string.

7. The illuminating device of claim 5, when the plurality of illuminating components have not sequentially displayed all characters in the string and the controlling signal is transmitted by the motion sensor to the processor, the processor re-drives the plurality of illuminating components to sequentially display each character in the string.

8. The illuminating device of claim 5, wherein the communication circuit ignores another picture transmitted by the input device when the plurality of illuminating components have not sequentially displayed all characters in the string.

9. The illuminating device of claim 4, wherein the plurality of illuminating components are arranged in a two-dimensional array and the storage stores the string and the string includes a first character to an Nth character, when the processor sequentially receives a plurality of controlling signals, the processor correspondingly and sequentially selects an Xth character from the N characters and drives the plurality of illuminating components to display the Xth character, wherein X≤N.

10. The illuminating device of claim 9, after displaying the Nth character, the processor then displaying the first character in the event the processor further receives a first controlling signal.

11. The illuminating device of claim 9, wherein the communication circuit stores another string transmitted by the input device into the storage after the processor drives the plurality of illuminating components to display the Xth character.

12. The illuminating device of claim 11, after the communication circuit stores another string into the storage, the processor then driving the plurality of illuminating components to display an X+1th character of another string in the event the processor receives a second controlling signal.

13. The illuminating device of claim 1, further comprising a sound circuit coupled to the controlling circuit, wherein the communication circuit receives a sound transmitted by the input device and stores the sound into the storage, and the processor drives the sound circuit to play the sound according to the controlling signal.

14. A wearable object with lighting function, comprising:
a main body;
an illuminating component set configured on the surface of the main body and comprising a plurality of the illuminating components;
a controlling circuit electrically coupled to the illuminating component set and configured in a contained part of the main body, the controlling circuit comprising:
a storage;
a processor electrically connected to the storage; and
a motion sensor coupled to the processor, the motion sensor generating a controlling signal while sensing an external force applied on the wearable object; and
a communication circuit electrically coupled to the controlling circuit for receiving and storing a picture transmitted by an input device outside of the wearable object into the storage, wherein the picture comprising a plurality of sub-pictures, and each of the sub-pictures at least comprises a character;
wherein the processor drives the illuminating components to sequentially display each of the plurality of sub-pictures or simultaneously display the plurality of sub-pictures according to the controlling signal and an illuminating mode, and selectively controls a size of each of the sub-pictures, a flash frequency of the sub-pictures, and/or a moving speed of the sub-pictures.

15. The wearable object of claim 14, wherein the main body is a shoe, the surface is a shoe surface of the shoe, and the contained part is a sole of the shoe; the motion sensor generates the controlling signal while sensing an external force applied on the shoe.

16. The wearable object of claim 14, wherein the illuminating mode is transmitted into the storage.

17. The wearable object of claim 14, wherein the processor selectively controls a size and a flash frequency of the picture shown on the illuminating component set according to a detected result of the motion sensor, the detected result is corresponding to at least one physical parameter of the controlling circuit.

18. The wearable object of claim 17, wherein the storage stores an illuminating color or a display frequency.

19. The wearable object of claim 14, wherein the motion sensor is a tri-axial acceleration sensor, the tri-axial acceleration sensor generates the controlling signal according to the external force applied on the wearable object and a moving direction of the wearable object.

20. An illuminating device configured to be embedded in a wearable object, comprising:
an illuminating component set comprising a plurality of illuminating components;
a controlling circuit coupled to the illuminating component set and configured to be embedded in the wearable object, the controlling circuit comprising:
a storage;
a processor electrically connected to the storage; and
a motion sensor coupled to the processor; and
a communication circuit electrically coupled to the controlling circuit, the communication circuit receiving a picture transmitted by an input device outside of the illuminating device and storing the picture into the storage, wherein the picture further comprises a first sub-picture, a second sub-picture and a third sub-picture, and the first sub-picture, the second sub-picture and the third sub-picture respectively comprise at least a character;
wherein the processor drives the illuminating components to emit light to the first sub-picture when the motion sensor generates a first controlling signal, the processor drives the illuminating components to emit light to display the second sub-picture when the motion sensor generates a second controlling signal, and the processor drives the illuminating components to emit light to display the third sub-picture when the motion sensor generates a third controlling signal, wherein the first controlling signal, the second controlling signal and the third controlling signal are separately generated by the motion sensor, the processor selectively controls a size, a display frequency, and/or a moving speed of the first sub-picture, the second sub-picture and the third sub-picture.

* * * * *